(12) United States Patent
Shin et al.

(10) Patent No.: US 12,220,921 B2
(45) Date of Patent: Feb. 11, 2025

(54) NOZZLE CLOGGING DEFECT COMPENSATING METHOD FOR BINDER JETTING STACK MANUFACTURING MEANS

(71) Applicant: Korea Electronics Technology Institute, Seongnam-si (KR)

(72) Inventors: Hwa Seon Shin, Yongin-si (KR); Sung Hun Park, Seoul (KR); Hye In Lee, Anyang-si (KR); Sung Hwan Chun, Seoul (KR); Jin Min Jang, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 385 days.

(21) Appl. No.: 17/780,117

(22) PCT Filed: Nov. 10, 2020

(86) PCT No.: PCT/KR2020/015676
§ 371 (c)(1),
(2) Date: May 26, 2022

(87) PCT Pub. No.: WO2021/107453
PCT Pub. Date: Jun. 3, 2021

(65) Prior Publication Data
US 2022/0410574 A1 Dec. 29, 2022

(30) Foreign Application Priority Data
Nov. 29, 2019 (KR) .......................... 10-2019-0156380

(51) Int. Cl.
*B41J 2/21* (2006.01)
*B41J 2/165* (2006.01)

(52) U.S. Cl.
CPC ......... *B41J 2/16579* (2013.01); *B41J 2/2139* (2013.01); *B41J 2/2142* (2013.01)

(58) Field of Classification Search
CPC ......... B41J 2/165; B41J 2/2139; B41J 2/2142
See application file for complete search history.

(56) References Cited

U.S. PATENT DOCUMENTS

| 2008/0110395 A1 | 5/2008 | Kritchman et al. |
| 2016/0342149 A1 | 11/2016 | Napadensky |

(Continued)

FOREIGN PATENT DOCUMENTS

| KR | 10-2007-0055725 A | 5/2007 |
| KR | 10-2013-0118784 A | 10/2013 |

(Continued)

OTHER PUBLICATIONS

Korean Office Action issued on Feb. 10, 2021, in counterpart Korean Patent Application No. 10-2019-0156380 (2 pages in English and 4 pages in Korean).

*Primary Examiner* — Scott A Richmond
(74) *Attorney, Agent, or Firm* — NSIP Law

(57) ABSTRACT

Provided is a nozzle clogging defect compensating method for compensating for a nozzle clogging defect appearing in a binder jetting stack manufacturing means. The nozzle clogging defect compensating method according to an embodiment of the present invention comprises the steps of: determining a defect occurrence region when a clogging defect of a nozzle used in the binder jetting stack manufacturing means occurs; determining whether compensation for the detect occurrence region is possible; when the compensation is possible, generating defect information and reflecting the defect information in an output code; setting a defect compensation region on the basis of the defect information; determining a defect compensation type of the defect compensation region; and reflecting a result of the determining in the output code. Accordingly, a replacement time and a replacement cost of an output head where the nozzle clog- (Continued)

ging defect has occurred can be saved, thereby reducing the unit production cost of a binder jetting type stack manufacturing output.

18 Claims, 14 Drawing Sheets

(56) References Cited

U.S. PATENT DOCUMENTS

| | | | | |
|---|---|---|---|---|
| 2018/0096472 | A1* | 4/2018 | Ukishima | H04N 1/6041 |
| 2018/0201014 | A1* | 7/2018 | Ohnishi | B41J 2/04581 |
| 2019/0291461 | A1* | 9/2019 | Neeb | B41J 2/2142 |

FOREIGN PATENT DOCUMENTS

| | | |
|---|---|---|
| KR | 10-2016-0038942 A | 4/2016 |
| KR | 10-2017-0102807 A | 9/2017 |

* cited by examiner

NOZZLE CLOGGING DEFECT COMPENSATING METHOD FOR BINDER JETTING STACK MANUFACTURING MEANS

CROSS REFERENCE TO RELATED APPLICATIONS

This application is a U.S. National Stage Application of International Application No. PCT/KR2020/015676, filed on Nov. 10, 2020, which claims the benefit under 35 USC 119(a) and 365(b) of Korean Patent Application No. 10-2019-0156380, filed on Nov. 29, 2019, in the Korean Intellectual Property Office, the entire disclosure of which is incorporated herein by reference for all purposes.

TECHNICAL FIELD

The present disclosure relates to a nozzle clogging defect compensation method for compensating for a nozzle jogging defect appearing in binder jetting additive manufacturing, and more particularly, to a nozzle clogging defect compensation method which makes a compensated output code to make strength and a shape of an output most similar to strength and a shape of a normal output, by compensating for an amount of nozzle binder sprayed around a defect portion.

BACKGROUND ART

Binder jetting in additive manufacturing refers to a method of building a shape by depositing by spraying a liquid adhesive and ink over a powdered material as shown in FIG. 1.

The binder jetting method is similar to a 2D printer ink jet method, and is divided into a piezo method which sprays by using a piezoelectric element as shown in FIG. 2, a thermal method which sprays by using water vapor pressure generated by heating a nozzle as shown in FIG. 3, and a bubble method which sprays by using an air bubble as shown in FIG. 4.

A problem that a spraying nozzle is clogged according to a binder property may appear in all of the three spraying methods, and the problem gets worse in the order of the thermal method, the piezo method, and the bubble method (bubble<piezo<thermal).

In particular, since the thermal method is a spraying method using heat, binder reacts to heat and the nozzle may be frequently clogged.

Accordingly, related-art devices may have inconvenience of having to clean a nozzle head after spraying 3-5 times in order to reduce a nozzle clogging phenomenon.

If a user proceeds with outputting without recognizing the nozzle clogging phenomenon, binder may not be sprayed onto a defect portion from the time when the defect occurs as shown in FIG. 5, and strength of an output may be reduced and a crack may appear.

Since the quality of an output is influenced only by a clogging defect of one or two nozzles, an output head in which a nozzle is clogged should be replaced immediately, and the replaced head may be directly discarded. Even when the head is repaired, it may take several days to repair, which may cause a unit cost of production of the output to increase.

DISCLOSURE

Technical Problem

The present disclosure has been developed in order to address the above-discussed deficiencies of the prior art, and an object of the present disclosure is to provide a nozzle clogging defect compensation method which is capable of outputting similarly to a normal output by adjusting an amount of nozzle binder sprayed onto a defect portion, without replacing an output head where a nozzle clogging defect occurs.

Technical Solution

According to an embodiment of the present disclosure to achieve the above-described object, a nozzle clogging defect compensation method includes the steps of: when a clogging defect occurs in a nozzle used in binder jetting additive manufacturing, determining a defect occurrence area; determining whether compensation for the defect occurrence area is possible; when the compensation is possible, generating defect information and reflecting the defect information on an output code; setting a defect compensation area based on the defect information; determining a defect compensation type of the defect compensation area; and reflecting a result of the determining on the output code.

In addition, the step of determining whether the compensation is possible may include estimating a compensation range according to binder viscosity, and, when the defect occurrence area is less than or equal to the estimated compensation range, determining the defect occurrence area as a compensable area.

In addition, the step of generating the defect information and reflecting the defect information on the output code may include, when the defect occurrence area is determined as the compensable area, generating the defect information based on sensing data of an output head provided with a sensor for sensing a user's input or a clogging defect of the nozzle.

In addition, the step of setting the defect compensation area may include setting the defect compensation area according to the binder viscosity, based on the reflected defect information.

In addition, the step of determining the defect compensation type may include individually determining the defect compensation type for every pixel constituting the defect compensation area.

In addition, the step of determining the defect compensation type may include determining a type of an output area and a type of an output state, based on an outline and surrounding compensation information of each pixel, and determining the defect compensation type by combining results of determining the respective types.

In addition, the type of the output area may be any one of an outline, a model body, or an empty area.

In addition, the type of the output state may be any one of a defect, compensation, an area that is neither the defect nor the compensation.

In addition, the step of determining the defect compensation type may include, when the results of determining the respective types are combined, omitting a procedure of determining the type of the output state with respect to a pixel the type of the output area of which is the empty area.

According to another embodiment of the present disclosure, a computer-readable recording medium has a computer program recorded thereon to perform a nozzle clogging defect compensation method, the method including the steps of: when a clogging defect occurs in a nozzle used in binder jetting additive manufacturing, determining a defect occurrence area; determining whether compensation for the defect occurrence area is possible; when the compensation is possible, generating defect information and reflecting the defect information on an output code; setting a defect compensation area based on the defect information; determining a defect compensation type of the defect compensation area; and reflecting a result of the determining on the output code.

In addition, according to another embodiment of the present disclosure, a nozzle clogging defect compensation method includes the steps of: when a clogging defect occurs in a nozzle used in binder jetting additive manufacturing, determining a defect occurrence area; delivering position information regarding the defect occurrence area to an output code generator according to a result of the determining; and generating an output code which compensates for an amount of nozzle spray around the defect occurrence area, based on the position information.

According to another embodiment of the present disclosure, a computer-readable recording medium has a computer program recorded thereon to perform a nozzle clogging defect compensation method, the method including the steps of: when a clogging defect occurs in a nozzle used in binder jetting additive manufacturing, determining a defect occurrence area; delivering position information regarding the defect occurrence area to an output code generator according to a result of the determining; and generating an output code which compensates for an amount of nozzle spray around the defect occurrence area, based on the position information.

Advantageous Effects

According to embodiments of the present disclosure as described above, a replacement time and a replacement cost of an output head where a nozzle clogging defect occurs may be saved, and accordingly, a unit cost of production of an output in binder jetting additive manufacturing may be reduced

BEST MODE

Hereinafter, the present disclosure will be described in more detail with reference to the drawings.

Figure 1:
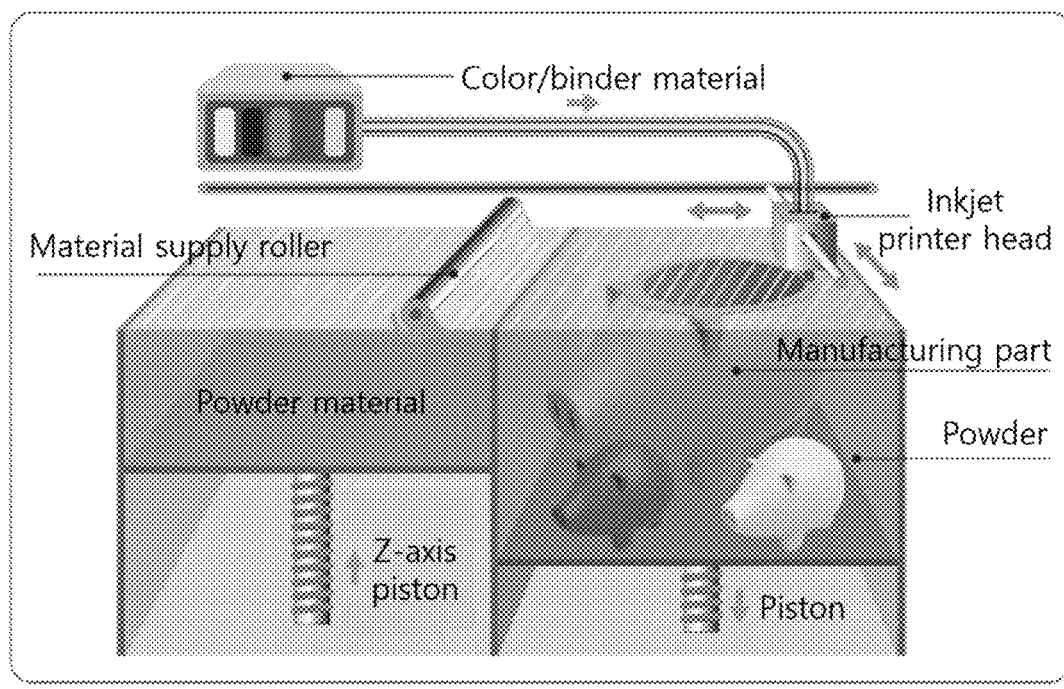
FIG. 1 is a view provided to explain a related-art binder jetting method.
Figure 2:
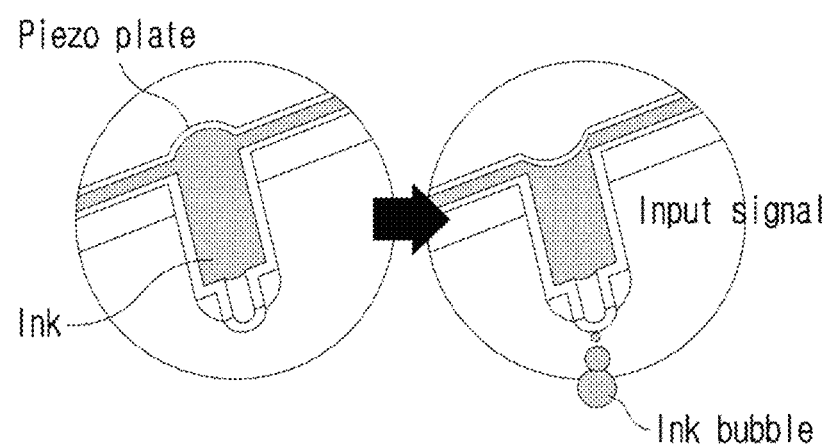
FIG. 2 is a view illustrating a related-art piezo spraying method.
Figure 3:
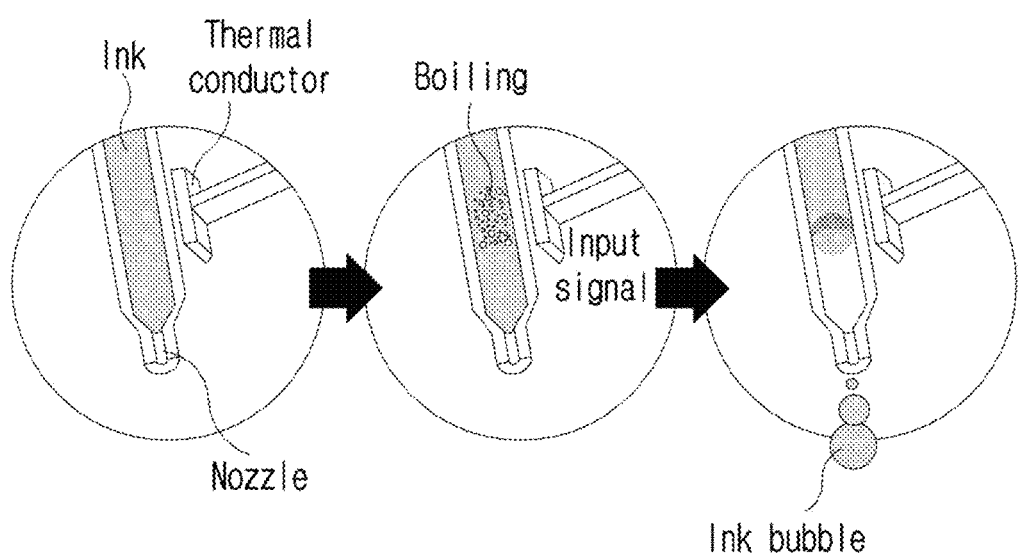
FIG. 3 is a view illustrating a related-art thermal spraying method.
Figure 4:
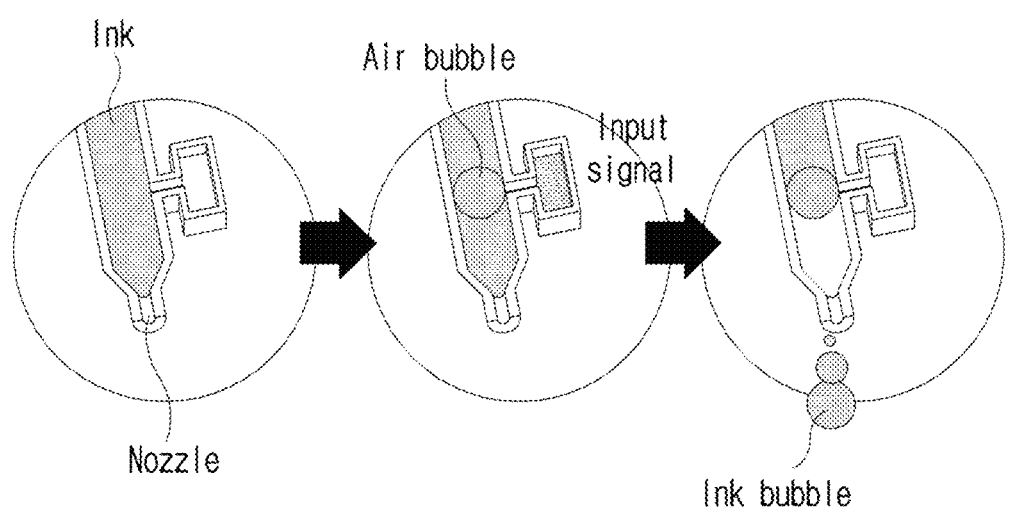
FIG. 4 is a view illustrating a related-art bubble spraying method.
Figure 5:
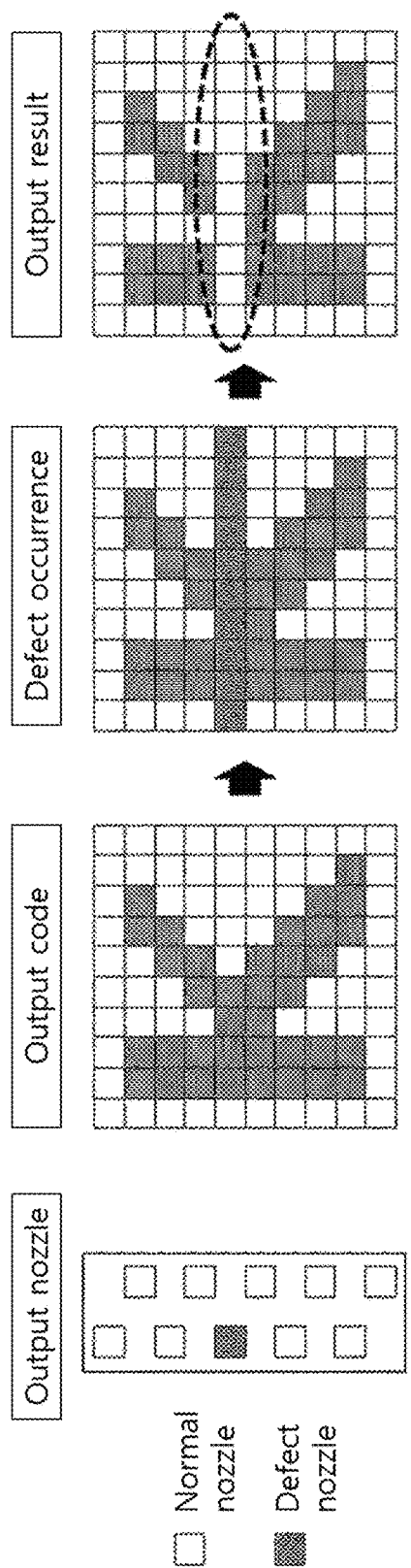
FIG. 5 is a view illustrating a crack of an output caused by a nozzle clogging defect.
Figure 6:
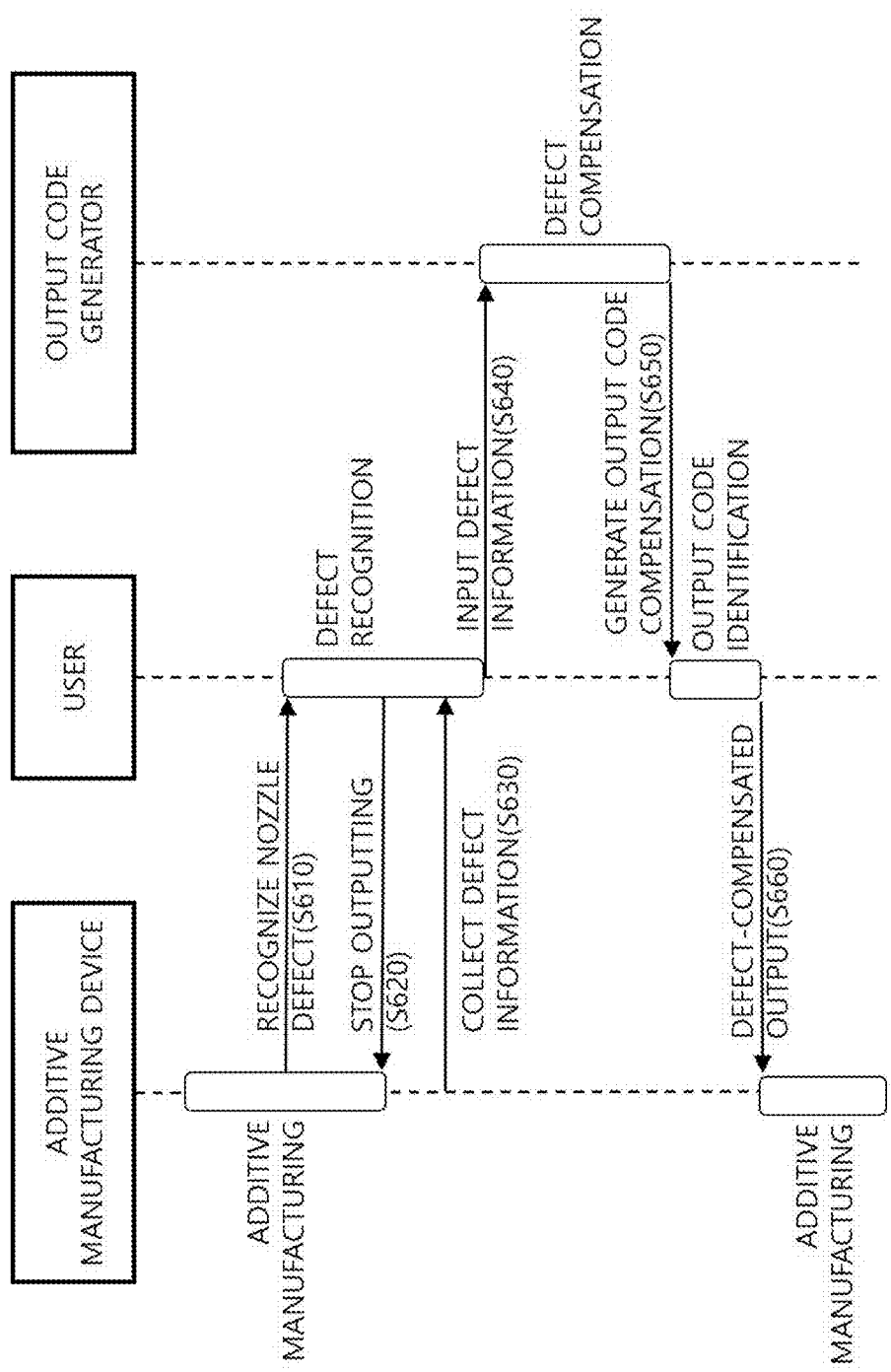
FIG. 6 is a view illustrating a nozzle clogging defect compensation process according to an embodiment of the present disclosure.

FIG. 6 is a view illustrating a nozzle clogging defect compensation process according to an embodiment of the present disclosure.

In binder jetting additive manufacturing, when a nozzle clogging defect occurs in an output head, the nozzle clogging defect compensation method according to the present embodiment may make a compensated output code to make strength and a shape of an output most similar to strength and a shape of a normal output, by compensating for an amount of nozzle binder sprayed onto a defect portion by using defect information regarding a nozzle clogging defect position, binder viscosity, model outline information.

To achieve this, when a nozzle clogging defect is recognized from an additive manufacturing device (S610), a user may stop the device and stop outputting (S620), and may grasp a nozzle clogging defect position (S630) and may input defect information regarding the nozzle clogging defect position to an output code generator (S640).

The output code generator may output an output code which compensates for an amount of nozzle spray around the defect portion through inputted compensation information (S650), and the user may proceed with additive manufacturing again by using the compensated output code (S660).

In the corresponding process, operations performed by the user may be automated through a monitoring system.

That is, the nozzle clogging defect may be recognized based on sensing data of an output head which is provided with a sensor for sensing a user's input or a clogging defect of the nozzle, and the compensation information may be generated by grasping the nozzle clogging defect position.

In addition, a defect compensation algorithm will be described in detail, on the assumption that the output code used in binder jetting additive manufacturing is in a grayscale image form (bitmap), an output is formed on an image pixel basis, and an amount of output binder is indicated by an image pixel value.

Figure 7:
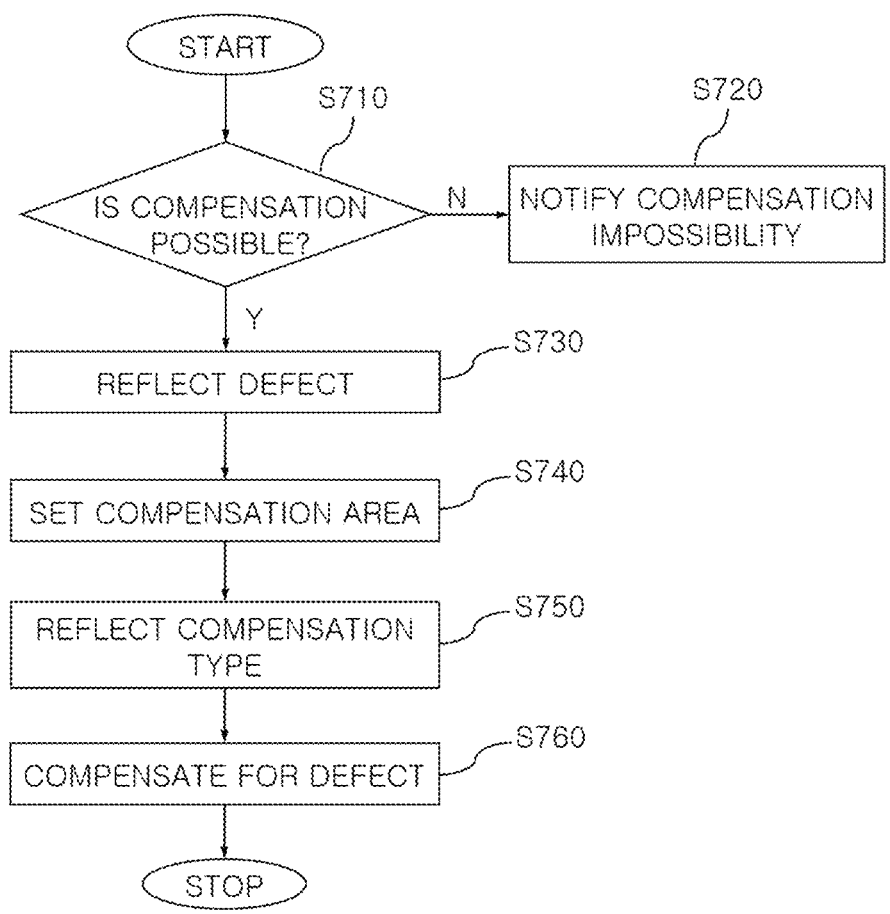
FIG. 7 is a view provided to explain a nozzle clogging defect compensation method according to an embodiment of the present disclosure.

FIG. 7 is a view provided to explain a nozzle clogging defect compensation method according to an embodiment of the present disclosure.

Referring to FIG. 7, the nozzle clogging defect compensation method will be described in more detail. The nozzle clogging defect compensation method according to the present embodiment may include a step of recognizing a nozzle clogging defect, a step of determining whether compensation is possible (S710), a step of reflecting the defect (S730), a step of setting a compensation area (740), a step of reflecting a compensation type (S750), and a step of compensating for the defect (760).

At the nozzle clogging defect recognition step, a nozzle clogging defect may be recognized through an output head provided with a sensor for sensing a user's input or a nozzle clogging defect, and a position of the nozzle clogging defect may be grasped.

At the step of determining whether compensation is possible, a compensation range may be estimated according to binder viscosity, and, when a defect occurrence area is less than or equal to the estimated compensation range, the defect occurrence area may be determined as a compensable area.

Figure 8A:
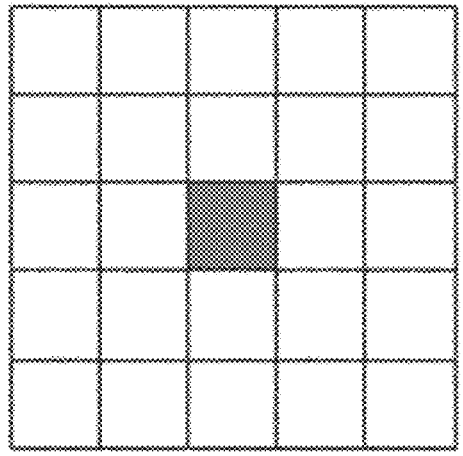
FIGS. 8A and 8B are views provided to explain a binder area where binder spreads when an amount of binder to be sprayed increases according to an embodiment of the present disclosure.
Figure 8B:
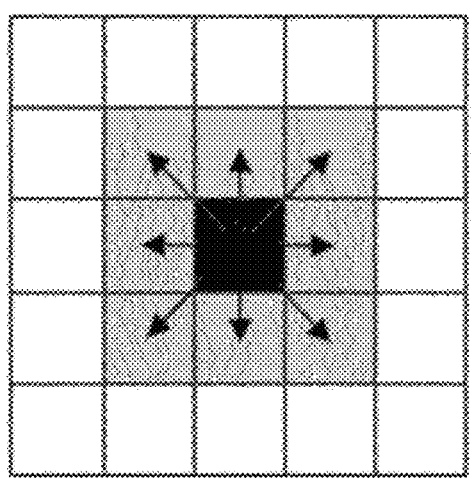

Herein, binder used in additive manufacturing has a liquid form, and, when an amount of binder to be sprayed increases more than that of a normal output as shown in FIGS. 8A and 8B, the binder spreads around. At the step of determining whether compensation is possible, binder viscosity regarding how far the binder spreads may be used as one of important parameters, and the compensation range may be estimated according to the binder viscosity.

Figure 9:
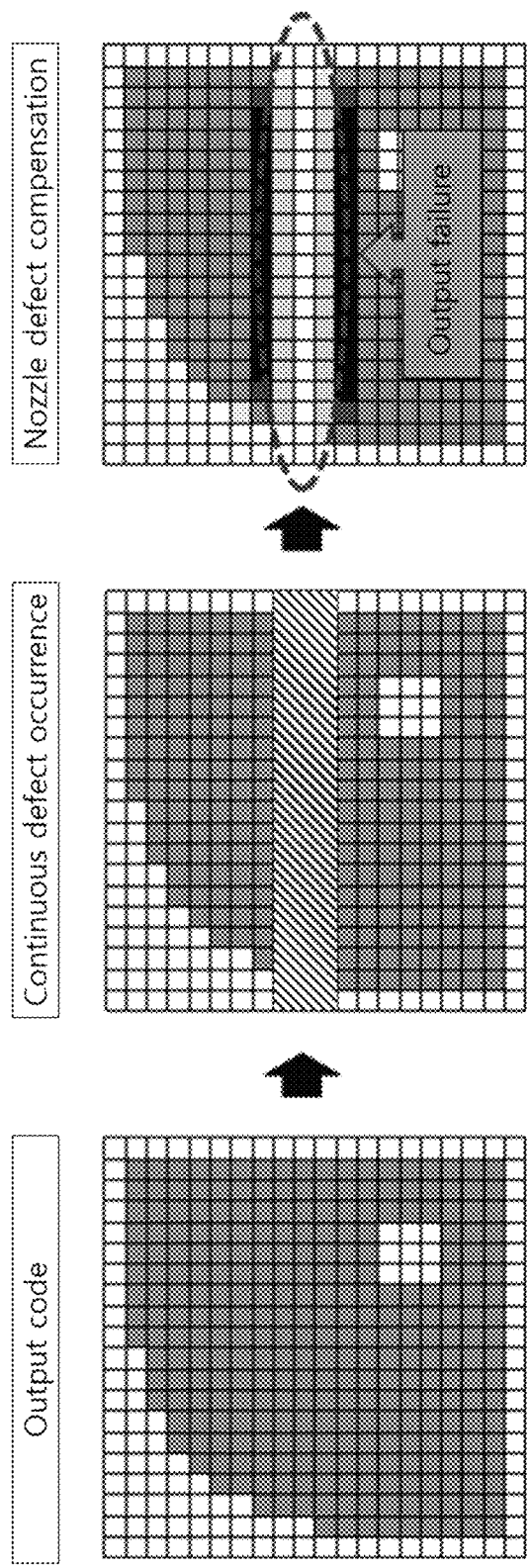
FIG. 9 is a view illustrating an example of failure of compensation caused by a continuous defect.

This is because, if a continuous defect exceeds the compensation range estimated by considering the binder viscosity as shown in FIG. 9, compensation for the defect may result in failure in outputting. Therefore, at the step of determining whether compensation is possible, it may be determined whether compensation is possible by using the binder viscosity and continuous defect information first.

Figure 10:
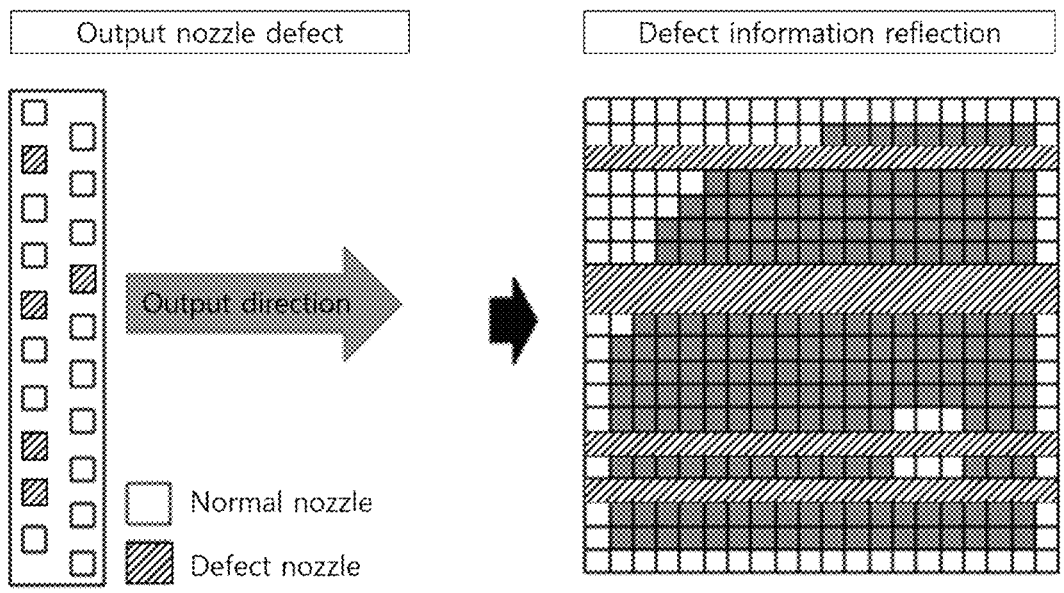
FIG. 10 is a view illustrating a result of reflecting nozzle clogging defect information according to an embodiment of the present disclosure.

At the defect reflection step, when compensation is possible (S710-Y), defect information may be generated and may be reflected on the output code as shown in FIG. 10.

Specifically, at the defect reflection step, when the defect occurrence area is determined as a compensable area (S710-Y), the defect information may be generated based on sensing data of the output head provided with the sensor for sensing a user's input or a nozzle clogging defect, or a monitoring module, and may be reflected on the output code.

In particular, when the defect information is generated based on the sensing data of the output head provided with the sensor for sensing a nozzle clogging defect, or the monitoring module, and is reflected on the output code, the defect information may be automatically recognized and the generated defect information may be reflected on the output code without user's intervention.

Figure 11:
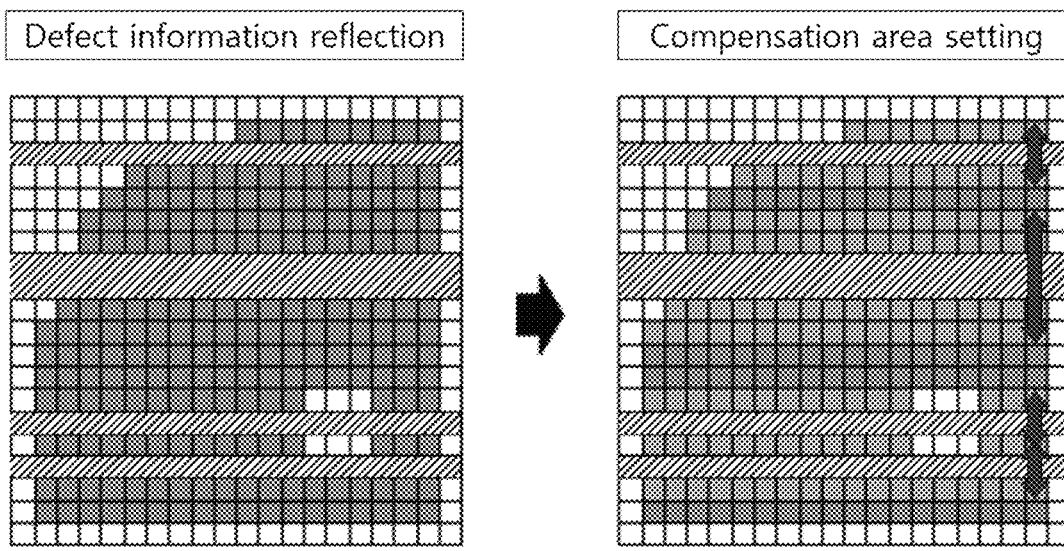
FIG. 11 is a view illustrating a result of setting a defect compensation area according to an embodiment of the present disclosure.

At the compensation area setting step, a defect compensation area may be set according to the binder viscosity based on the reflected defect information as shown in FIG. 11.

An outline, surrounding compensation information may be important parameters when a nozzle clogging defect is compensated for.

There may be an outline around a pixel to be compensated, and in this case, when compensation is excessively performed, an output shape may be different from a normal output.

In addition, an outline, a model body, an empty area should be considered as factors regarding an output area, and a defect, compensation, and an area that is neither the defect nor the compensation should be considered as factors regarding an output state. Therefore, a type of the output area may be any one of the outline, model body, or empty area, and a type of the output state may be any one of the defect, compensation, the area that is neither the defect nor the compensation.

Figure 12:
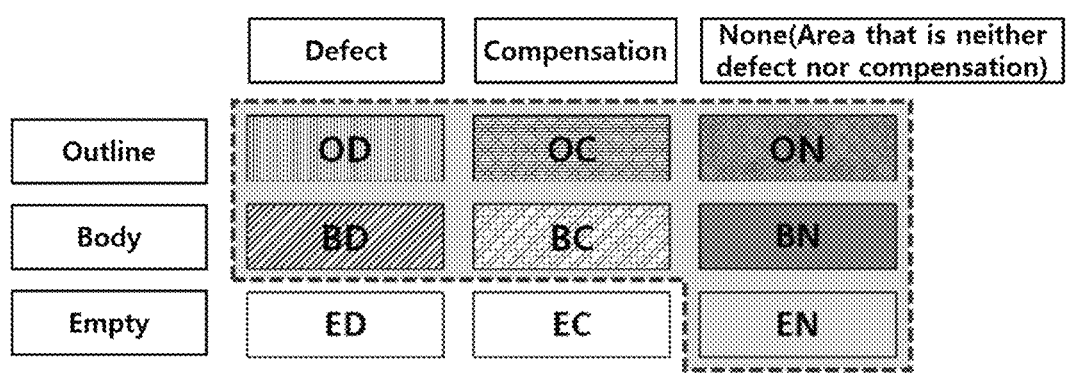
FIG. 12 is a view provided to explain defect compensation types classified according to an embodiment of the present disclosure.

That is, these elements may be combined, and, if the type of the output state is omitted with respect to a pixel the type of the output area of which is the empty area, there may be 7 compensation types as shown in FIG. 12.

Accordingly, at the compensation type reflection step, defect compensation types may be individually determined among the classified 7 types for every pixel constituting the defect compensation area, and results of determining the defect compensation types may be reflected on the output code.

That is, at the compensation type reflection step, a type of the output area and a type of the output state may be determined for every pixel, based on the outline and the surrounding compensation information, and a defect compensation type may be determined by combining the results of determining the respective types.

Figure 13:
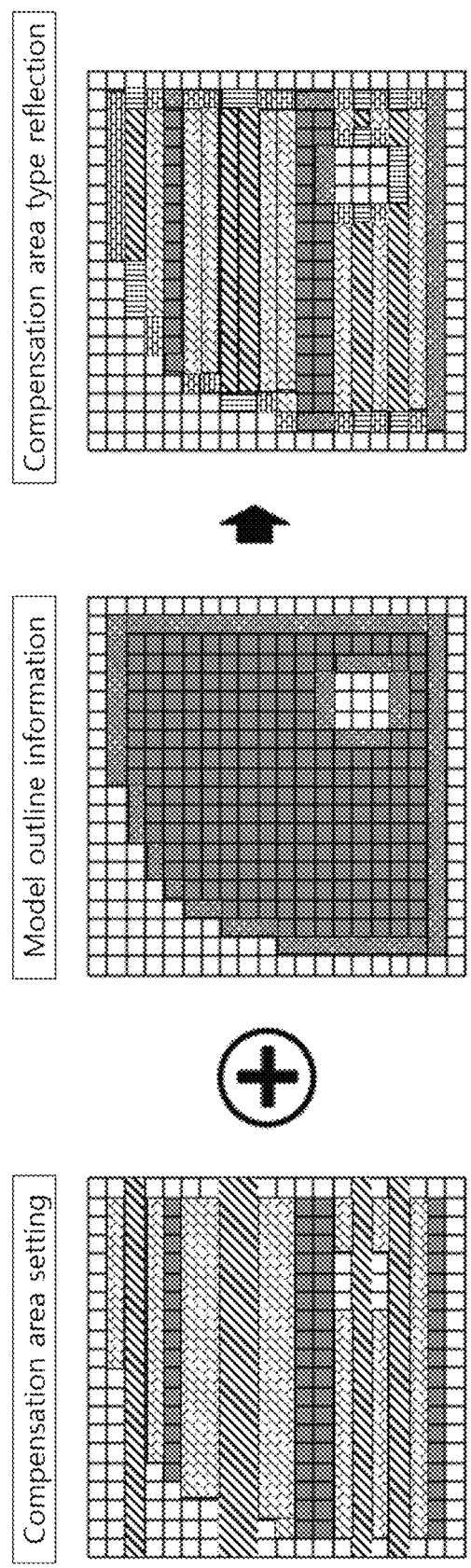
FIG. 13 is a view illustrating a result of reflecting 7 compensation types utilizing model outline information according to an embodiment of the present disclosure.

A result of reflecting the 7 types based on the set compensation area is illustrated in FIG. 13.

At the compensation type reflection step, an output code which is actually compensated based on the result of reflecting a compensation area type may be made.

The 7 defect compensation types are meaningful when they are combined and indicate a certain situation.

Specifically, a compensation value may vary according to a case where a compensation pixel is a model body (type: BC), a case where an outline has a defect (type: OD), or a case where a model body has a defect (type: BD).

A possible combination of compensation types is not limited since the compensation range varies according to a size of a continuous defect and a determination area varies according to binder viscosity.

Figure 14:
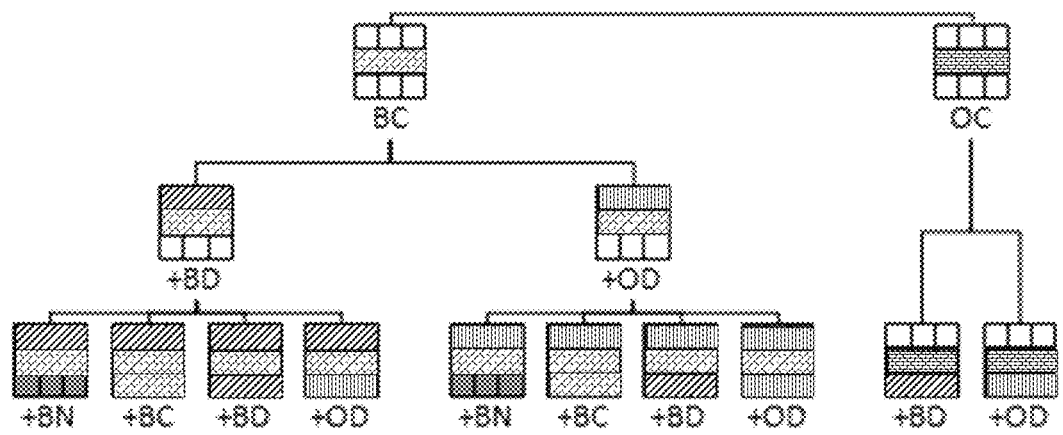
FIG. 14 is a view illustrating basic situations according to defect compensation types under a predetermined condition according to an embodiment of the present disclosure.

For example, when a defect in the form of one line appears multiple times and a situation determination range is an area of 3*3, examples of combinations of types are illustrated in FIG. 14. In this case, if a diagonal, single pixel type is not considered and inversion is included and overlapping is removed, there may be 17 basic situations in total.

At the defect compensation step, a combination of types is determined based on the reflected compensation type and the defect is compensated for.

Figure 15:
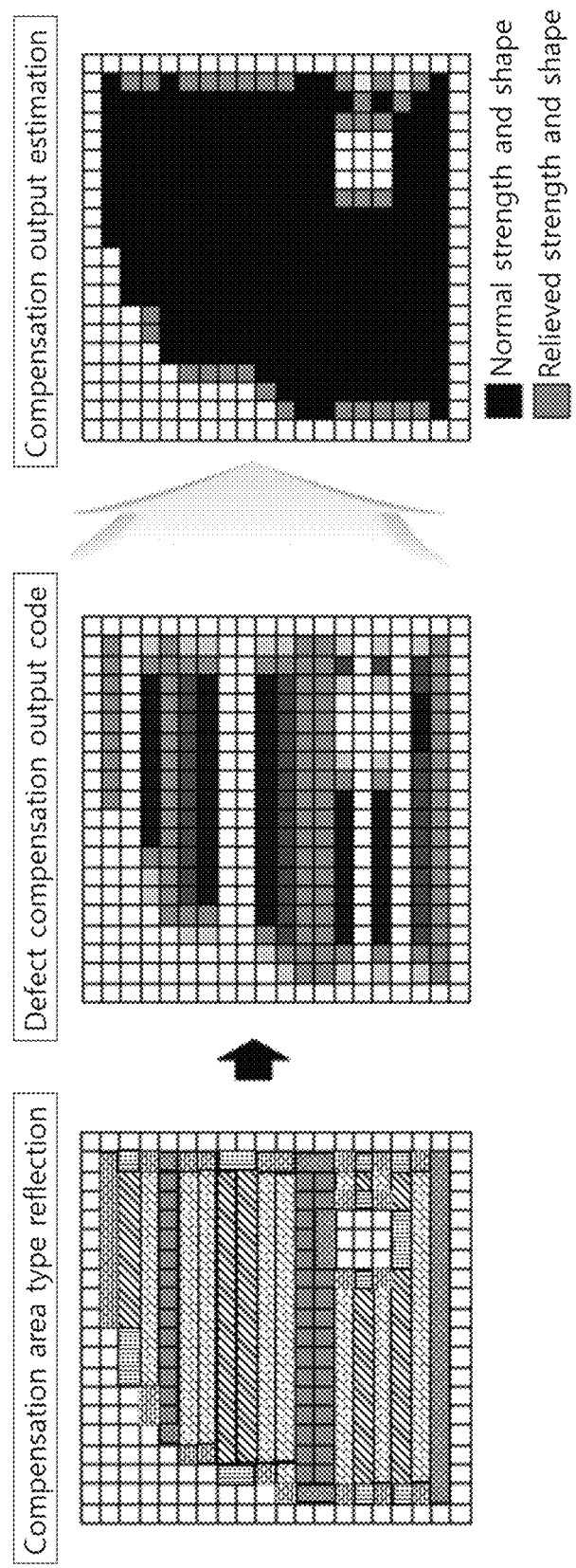
FIG. 15 is a view illustrating a result of estimating a compensated output by reflecting a compensation area type on a defect compensation output code according to an embodiment of the present disclosure.

The result of compensating is provided to the user as an output code, and FIG. 15 illustrates generation of a defect compensation output code and estimation of a result of real output. As shown in FIG. 15, a relieved strength and shape portion in the result of outputting refers to a portion that is outputted but has strength and a shape weaker than a normal output.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A nozzle clogging defect compensation method comprising:
   when a clogging defect occurs in a nozzle used in binder jetting additive manufacturing, determining a defect occurrence area;
   determining whether compensation for the defect occurrence area is possible;
   when the compensation is possible, generating defect information and reflecting the defect information on an output code;
   setting a defect compensation area based on the defect information;
   determining a defect compensation type of the defect compensation area; and
   reflecting a result of the determining on the output code,
   wherein the determining whether the compensation is possible comprises estimating a compensation range according to binder viscosity, and, when the defect occurrence area is less than or equal to the estimated compensation range, determining the defect occurrence area as a compensable area.

2. The nozzle clogging defect compensation method of claim 1, wherein the generating the defect information and reflecting the defect information on the output code comprises, when the defect occurrence area is determined as the compensable area, generating the defect information based on sensing data of an output head provided with a sensor for sensing a user's input or a clogging defect of the nozzle.

3. The nozzle clogging defect compensation method of claim 2, wherein the setting the defect compensation area comprises setting the defect compensation area according to the binder viscosity, based on the reflected defect information.

4. The nozzle clogging defect compensation method of claim 1, wherein the determining the defect compensation type comprises individually determining the defect compensation type for every pixel constituting the defect compensation area.

5. The nozzle clogging defect compensation method of claim 4, wherein the determining the defect compensation type comprises determining a type of an output area and a type of an output state, based on an outline and surrounding compensation information of each pixel, and determining the defect compensation type by combining results of determining the respective types.

6. The nozzle clogging defect compensation method of claim 5, wherein the type of the output area is any one of an outline, a model body, or an empty area.

7. The nozzle clogging defect compensation method of claim 6, wherein the type of the output state is any one of a defect, compensation, an area that is neither the defect nor the compensation.

8. The nozzle clogging defect compensation method of claim 7, wherein the determining the defect compensation type comprises, when the results of determining the respective types are combined, omitting a procedure of determining the type of the output state with respect to a pixel the type of the output area of which is the empty area.

9. A non-transitory computer-readable recording medium having a computer program recorded thereon and storing instructions that, when executed by one or more processors, configure the one or more processors to perform a nozzle clogging defect compensation method, the method comprising:
   when a clogging defect occurs in a nozzle used in binder jetting additive manufacturing, determining a defect occurrence area;
   determining whether compensation for the defect occurrence area is possible;
   when the compensation is possible, generating defect information and reflecting the defect information on an output code;
   setting a defect compensation area based on the defect information;
   determining a defect compensation type of the defect compensation area; and
   reflecting a result of the determining on the output code,
   wherein the determining whether the compensation is possible comprises estimating a compensation range according to binder viscosity, and, when the defect occurrence area is less than or equal to the estimated compensation range, determining the defect occurrence area as a compensable area.

10. A non-transitory computer-readable recording medium having a computer program recorded thereon and storing instructions that, when executed by one or more processors, configure the one or more processors to perform a nozzle clogging defect compensation method, the method comprising:
    when a clogging defect occurs in a nozzle used in binder jetting additive manufacturing, determining a defect occurrence area;
    determining whether compensation for the defect occurrence area is possible;
    delivering position information regarding the defect occurrence area to an output code generator according to a result of the determining; and
    generating an output code which compensates for an amount of nozzle spray around the defect occurrence area, based on the position information;
    setting a defect compensation area based on the position information;
    determining a defect compensation type of the defect compensation area; and
    reflecting a result of the determining a defect compensation type on the output code;
    wherein the determining whether the compensation is possible comprises estimating a compensation range according to binder viscosity, and, when the defect occurrence area is less than or equal to the estimated compensation range, determining the defect occurrence area as a compensable area.

11. A nozzle clogging defect compensation method comprising:
    when a clogging defect occurs in a nozzle used in binder jetting additive manufacturing, determining a defect occurrence area;
    determining whether compensation for the defect occurrence area is possible;
    delivering position information regarding the defect occurrence area to an output code generator according to a result of the determining;
    generating an output code which compensates for an amount of nozzle spray around the defect occurrence area, based on the position information;
    setting a defect compensation area based on the position information;
    determining a defect compensation type of the defect compensation area; and
    reflecting a result of the determining a defect compensation type on the output code;

wherein the determining whether the compensation is possible comprises estimating a compensation range according to binder viscosity, and, when the defect occurrence area is less than or equal to the estimated compensation range, determining the defect occurrence area as a compensable area.

12. The nozzle clogging defect compensation method of claim 11, wherein the generating the defect information and reflecting the defect information on the output code comprises, when the defect occurrence area is determined as the compensable area, generating the defect information based on sensing data of an output head provided with a sensor for sensing a user's input or a clogging defect of the nozzle.

13. The nozzle clogging defect compensation method of claim 12, wherein the setting the defect compensation area comprises setting the defect compensation area according to the binder viscosity, based on the reflected defect information.

14. The nozzle clogging defect compensation method of claim 11, wherein the determining the defect compensation type comprises individually determining the defect compensation type for every pixel constituting the defect compensation area.

15. The nozzle clogging defect compensation method of claim 14, wherein the determining the defect compensation type comprises determining a type of an output area and a type of an output state, based on an outline and surrounding compensation information of each pixel, and determining the defect compensation type by combining results of determining the respective types.

16. The nozzle clogging defect compensation method of claim 15, wherein the type of the output area is any one of an outline, a model body, or an empty area.

17. The nozzle clogging defect compensation method of claim 16, wherein the type of the output state is any one of a defect, compensation, an area that is neither the defect nor the compensation.

18. The nozzle clogging defect compensation method of claim 17, wherein the determining the defect compensation type comprises, when the results of determining the respective types are combined, omitting a procedure of determining the type of the output state with respect to a pixel the type of the output area of which is the empty area.

\* \* \* \* \*